United States Patent
Heim

(10) Patent No.: US 9,038,468 B2
(45) Date of Patent: May 26, 2015

(54) APPARATUS AND METHOD FOR DETERMINING A DAMAGE STATE OF A WHEEL BEARING

(75) Inventor: Jens Heim, Bergrheinfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 350 days.

(21) Appl. No.: 13/634,635

(22) PCT Filed: Feb. 10, 2011

(86) PCT No.: PCT/EP2011/051974
§ 371 (c)(1),
(2), (4) Date: Sep. 13, 2012

(87) PCT Pub. No.: WO2011/117020
PCT Pub. Date: Sep. 29, 2011

(65) Prior Publication Data
US 2013/0008254 A1 Jan. 10, 2013

(30) Foreign Application Priority Data
Mar. 26, 2010 (DE) .......................... 10 2010 012 915

(51) Int. Cl.
*G01M 13/04* (2006.01)
(52) U.S. Cl.
CPC ............ *G01M 13/04* (2013.01); *G01M 13/045* (2013.01)
(58) Field of Classification Search
CPC .. G01M 13/045; G01M 13/028; G01H 1/003; G01H 1/006

USPC ......... 73/593, 660; 340/682, 683; 702/34, 35, 702/39
See application file for complete search history.

(56) References Cited

U.S. PATENT DOCUMENTS

| | | | |
|---|---|---|---|
| 7,107,850 B2 * | 9/2006 | Maeda et al. ................... | 73/593 |
| 7,543,499 B2 * | 6/2009 | Stubenrauch et al. .......... | 73/593 |
| 7,599,804 B2 * | 10/2009 | Pecher ............................ | 702/39 |
| 7,640,139 B2 * | 12/2009 | Sahara et al. ................. | 702/183 |
| 7,650,254 B2 * | 1/2010 | Pecher et al. ................. | 702/113 |
| 7,860,633 B2 * | 12/2010 | Stubenrauch et al. .......... | 701/60 |
| 2006/0081049 A1 * | 4/2006 | Stubenrauch et al. .......... | 73/593 |
| 2009/0179748 A1 * | 7/2009 | Stephen et al. ............... | 340/447 |
| 2009/0216397 A1 | 8/2009 | Stubenrauch et al. | |
| 2010/0071469 A1 * | 3/2010 | Luo et al. ........................ | 73/593 |
| 2014/0123760 A1 * | 5/2014 | Klos et al. ...................... | 73/593 |
| 2014/0216159 A1 * | 8/2014 | Gattermann et al. ........... | 73/593 |

FOREIGN PATENT DOCUMENTS

| | | |
|---|---|---|
| DE | 102007045109 | 4/2009 |
| JP | 2006153554 | 6/2006 |
| WO | 2005121809 | 12/2005 |

* cited by examiner

*Primary Examiner* — Helen Kwok
(74) *Attorney, Agent, or Firm* — Volpe and Koenig, P.C.

(57) ABSTRACT

An apparatus and a method for determining a damage state of a wheel bearing (12), in which a wheel (15) with a tire (9) arranged on a rim (8) in such a manner that the wheel can be rotated on an axle, in a motor vehicle, in particular during maintenance work on the motor vehicle. In order to avoid the wheel bearing (12) being accessed unnecessarily, a sensor unit (1) which communicates with an evaluation unit and is removably fastened radially outside a screw circle (11) of the rim (8) is provided for the purpose of determining the damage state.

10 Claims, 2 Drawing Sheets

APPARATUS AND METHOD FOR DETERMINING A DAMAGE STATE OF A WHEEL BEARING

FIELD OF THE INVENTION

The invention relates to an apparatus and a method for determining a state of damage of a wheel bearing, in which a wheel with a tire arranged on a rim is rotatably provided on an axle of a motor vehicle, in particular during maintenance work of the motor vehicle.

BACKGROUND

The wheels having tires, fitted onto rims, of motor vehicles are attached with their rims by means of screws of a screw circle on flange surfaces of wheel bearings in such a way that they can rotate with respect to the axis of the motor vehicle, and are accommodated substantially free of play by means of a wheel bearing. Due to high mileage/kilometerage, influences of dirt and temperature and the like, the wheel bearings are subject to wear, as a result of which their frictional resistance, noise behavior and bearing behavior are changed, with the result that they have to be replaced, under certain circumstances. It has become apparent in this context that the effects of a damaged wheel bearing which are to be assessed are confused with effects of other components of the motor vehicle because, for example, a noise behavior which is assigned to a damaged wheel bearing originates from a cardan shaft, with the result that the complex access to the wheel bearing or its removal is not necessary.

SUMMARY

The object of the invention is therefore to avoid, or at least reduce, unnecessary access to the wheel bearing.

The object is achieved by means of an apparatus for determining a state of damage of a wheel bearing, in which a wheel with a tire arranged on a rim is rotatably provided on an axle of a motor vehicle, in particular during maintenance work of the motor vehicle, wherein a sensor unit which communicates with an evaluation unit is provided for determining the state of damage, which sensor unit is removably attached radially outside of a screw circle of the rim.

Such an apparatus is provided for use in motor vehicles, for example in passenger cars and preferably utility vehicles. In this context, in particular in the case of suspicious behavior of a wheel bearing, for example in the case of a changed generation of noise of one or more wheel bearings the sensor unit is to be attached to the rim of a wheel with the suspected wheel bearing so that during a rotational movement of the wheel, for example during a test run, the sensor unit, which is capable of differentiating a normal state from a state of damage, can, if appropriate, detect a state of damage. In this context, in the simplest case the sensor units can completely contain the evaluation unit so that after a test run said sensor unit directly indicates the test result, that is to say whether or not the wheel bearing is considered to be damaged. However, it may be advantageous, in particular for reasons of mass, if the sensor unit stores the detected measurement data in an associated storage module and/or transmits data telemetrically to the evaluation unit, for example to a diagnostic device, during or after the test run. Alternatively, data stored after the test run can be transmitted to the evaluation unit via a connecting cable. The sensor unit can contain an electronic data processing unit which converts detected measurement data, and performs impedance conversion, analog/digital conversion, standardization, conversion into a transmission protocol and/or the like.

In this context the sensor unit is to be attached to the rim with simple means and without complex tools. In this context it has proved advantageous if techniques which are known for the maintenance of motor vehicles are used in service workshops. In this context techniques for balancing the wheels are particularly advantageously used. For example, the sensor unit can be attached clamped between the tire and a rim flange of the rim. For this purpose the sensor unit and additional modules which may be necessary, such as memories, power supply systems and the like, are arranged on an adaptor which has a clip corresponding to a balancing weight, with the result that, in particular in the case of steel rims, the sensor unit can be easily clamped tight to the rim flange with a clamping tongue in a time-saving fashion.

Alternatively, in particular in the case of lightweight metal alloy rims, the sensor unit can be attached in a reversibly materially joined fashion to a rim bed of the rim. For example, an adaptor which is correspondingly prepared can be bonded with the sensor unit to the rim bed. Adhesives which dissolve under the inference of heat may prove particularly advantageous for connecting the adaptor to the rim bed, with the result that the sensor unit easily adheres to the rim bed and can be easily detached again after the test phase or measurement phase by supplying heat.

The sensor unit is preferably formed from an at least single axis-measuring acceleration sensor which, in the direction of its sensitivity to accelerations, is arranged radially or tangentially with respect to the rotational axis of the wheel as a measurement axis.

This results in a method according to the invention for determining a state of damage of a wheel bearing by means of the described apparatus, wherein during maintenance of the motor vehicle the sensor unit is attached to the wheel, composite signals of the sensor unit which are dependent on the rotational speed of the wheel and the solid-borne sound, on the rotating wheel are detected and solid-borne sound signals of the wheel bearing which are typical of the state of damage are separated from the composite signals. It has proven advantageous in this context if the separated solid-borne sound signals are compared with comparison data which are relevant for the state of damage. These comparison data can be stored in a memory of the sensor unit and/or in the evaluation unit as characteristic diagrams or are calculated using corresponding parameters in formulas. A resulting state of damage, for example a damage index, can be determined from the comparison of the measured solid-borne sound signals and of the stored comparison data, and said damage index can serve to assess whether the affected wheel bearing is to be accessed or, if appropriate, replaced. The sensor unit can accordingly be removed from the wheel again. Of course, a plurality of wheels can be equipped simultaneously with sensor units, wherein the evaluation of the signals can be performed by a single evaluation unit by using different signal codes.

The detected composite signal or signals produce a dependency of the detected signals from the sensor unit, which rotates at the rotational speed of the wheel and in the process is subject to acceleration due to gravity, on the wheel speed and the solid-borne sound signals of the wheel and of other sound sources. The separation of the solid-borne sound signals from the composite signals can be performed by filtering the composite signals. For example, a fast-Fourier-transform analysis (FFT) can be carried out in order to isolate the generally sinusoidal signal profiles of the rotational-speed-dependent component of the composite signal from the solid-borne-sound vibrations. Alternatively or additionally, methods of envelope curve demodulation (ECD), phase locked loop (PLL) and the like can be used to separate the rotational-speed-dependent component from the component of the solid-borne sound in the composite signals.

In this context, the wheel speed of the wheel or wheels which are equipped with a sensor unit can be determined from the actual signal behavior of the composite signals over time. The wheel speed can be determined, for example, from acceleration signals of the sensor unit. For example, sequences of composite signals which are stored or transmitted continuously via cable or in a wireless fashion to an evaluation unit can be evaluated for this purpose. Alternatively or additionally, the rotational-speed-dependent component can be determined by using sensor signals of a rotational-speed-detection device which is permanently arranged in the motor vehicle. For example, the signals which are made available by a wheel speed sensor of an anti-lock brake system, of a traction control system or the like can serve to determine the rotational-speed-dependent component. These signals may be made available, for example, by means of a data bus, for example CAN bus which is internal to the motor vehicle, and can be transmitted, for example by means of a diagnostic plug, to the evaluation unit and correspondingly processed there. In the text which follows, rotational speed signals of, for example, a wheel speed sensor can be directly extracted by positioning a measuring caliper around the lines between the rotational speed sensor and an evaluation unit. Of course, the evaluation unit may be a vehicle diagnostic device which can detect, evaluate, store and display a multiplicity of functions, if appropriate of a plurality of types of vehicle.

It has proven advantageous to process further the solid-borne sound signals acquired by the rotational-speed-dependent component of the composite signals in order to be able to selectively assign said solid-borne sound signals to the solid-borne sound signals of the wheel bearing. For this purpose it has proven advantageous to compare the acquired solid-borne sound signals with the relevant comparison data which represent typical solid-borne sound signals. For example, frequency-dependent comparison signals or signal patterns may be provided as comparison data which, on the one hand, assign the solid-borne sound signals as significant to the solid-borne sound behavior of the wheel bearing, and not, for example, to some other sound source, and, on the other hand, make available a comparison criterion, for example in the form of solid-borne sound thresholds, which may in turn be of different levels depending on the frequency, starting from which comparison criterion a wheel bearing has a state of damage or an examination is to be carried out by accessing the wheel bearing.

According to the inventive idea, in this context different parameter sets of relevant comparison data can be respectively stored in the evaluation unit for a multiplicity of radial bearings which are embodied in different ways with respect to their geometric embodiment. The geometric embodiment of the wheel bearing, for example mass, diameter, embodiment of the roller bodies, pressure angle, osculation, encapsulation, lubrication and the like determine the solid-borne sound behavior of the wheel bearing here. The assignment of the relevant comparison data to the individual types of wheel bearing may be dependent, for example, on vehicle data which is input to the evaluation unit or read in, for example, by means of diagnostic plugs.

It has furthermore proven advantageous if the wheel is at least roughly balanced after the mounting of the sensor unit. For this purpose, balancing masses which correspond to the mass of the sensor unit can be attached, for example, diametrically with respect to the sensor unit using corresponding means—bonding or clamping.

BRIEF DESCRIPTION OF THE DRAWINGS

The invention will be explained in more detail on the basis of exemplary embodiments illustrated in FIGS. 1 to 5, in which.

DETAILED DESCRIPTION OF THE PREFERRED EMBODIMENTS

Figure 1:
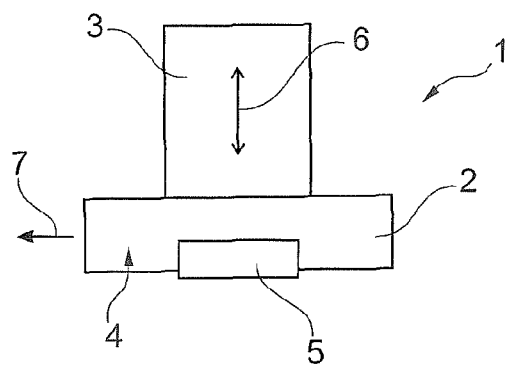
FIG. 1 shows a schematically illustrated sensor unit with an adaptor for attachment to a wheel by means of a clamping connection.

FIG. 1 shows a schematic illustration of a view of the sensor unit 1 with the acceleration sensor 3. The acceleration sensor 3 is arranged on the adaptor 2, for example screwed, latched and/or bonded thereto. The acceleration sensor can be encapsulated on the adaptor to protect against the influences of weather.

The adaptor is designed in accordance with a balancing weight for balancing wheels with a rim and a tire, and has a support surface 4 which is matched to the profile of a rim flange of the rim, preferably a steel rim, which is adjoined, at a distance therefrom, by the clamping clip 5, with the result that the sensor unit 1 can, for example, be attached to the rim flange and clamped thereto by means of a clamping assembly.

The preferably single-axis acceleration sensor 3 is arranged, with respect to its direction of action along the double arrow 6 substantially perpendicularly with respect to the extent of the adaptor 2 in the circumferential direction along the arrow 7, that is to say the direction of action of the acceleration sensor is radial with respect to the rotational axis of the wheel.

Figure 2:
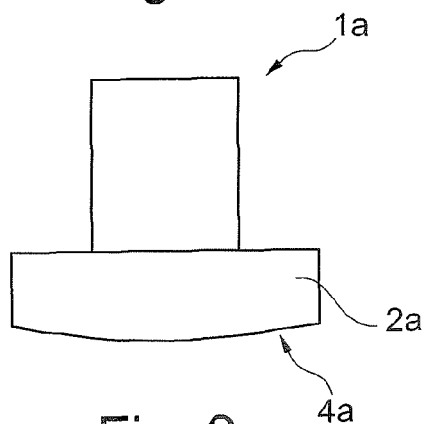
FIG. 2 shows a schematic illustration of a sensor unit which is modified compared to the sensor unit in FIG. 1, with a bonding connection for attachment to the wheel.

FIG. 2 shows, in a refinement of the sensor unit 1 in FIG. 1, the sensor unit 1a with the adaptor 2a which provides for use of the sensor unit 1a on a rim bed of the rim, preferably of a lightweight metal alloy rim. For this purpose, the contact surface 4a is provided with a radius which is averaged to frequently occurring radii of the rim beds of various rims. Alternatively, sensor units which are correctly matched for each radius can be provided. The removable attachment of the sensor unit 1a to the rim bed is preferably effected by bonding such as hot bonding, wherein the contact surface 4a is bonded to the rim bed and is released again after use, for example by supplying heat. Differences which occur under certain circumstances in the radii of the contact surface 4a and of the rim bed can be compensated by corresponding addition of material.

The sensor units 1, 1a of the FIGS. 1 and 2 preferably communicate in a wireless fashion with the associated evaluation unit, for example a diagnostic device or a diagnostic center of a service workshop. If appropriate, a mobile evaluation unit can be transported in the motor vehicle, with the result that during the journey data of the sensor units 1, 1a can be recorded in the evaluation unit, processed and if appropriate, stored and/or displayed.

Figure 3:
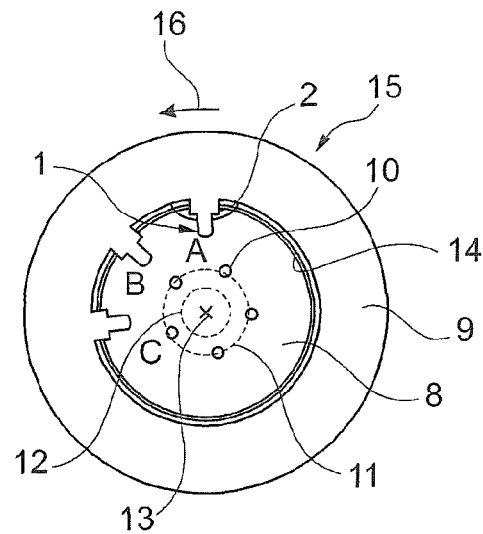
FIG. 3 shows a schematic illustration of a wheel with a sensor unit in various rotational positions of the wheel.

FIG. 3 is a schematic view of the wheel 15 of a motor vehicle with the rim 8 on which the tire 9 is fitted. The rim 8 is held by means of the screws 10 of the screw circle 11 on a bearing flange, covered by the rim, of the wheel bearing 12 which is indicated only schematically and by dashes, and which therefore holds the wheel 15 in such a way that it can rotate about the rotational axis 13 on a fixed axle (not illustrated). The sensor unit 1 is attached radially outside the screw circle 11 by means of the adaptor 2 to the rim flange 14 of the rim 8 by means of a clamping connection. When the wheel 15 rotates in the direction of the arrow 16, the sensor unit 1 rotates out of the position A into the positions B and C which are shown by way of example, and said sensor unit 1 subsequently rotates about the rotational axis 13.

In the case of composite signals of the acceleration sensor 2 (FIG. 1) of the sensor unit 1 which are detected continuously, for example with a fixed detection rate, a sinusoidal signal is obtained over the rotations of the wheel, as a function of the acceleration due to gravity.

Figure 4:
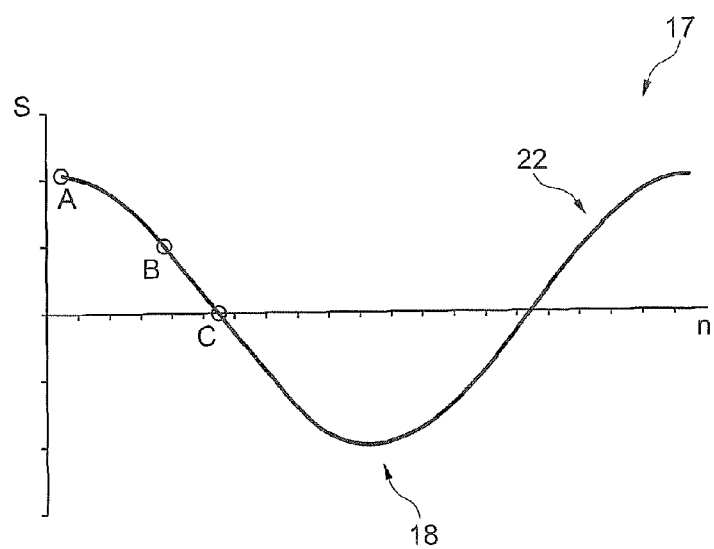
FIG. 4 shows a diagram of a profile of a composite signal plotted over the rotational movement of a wheel without solid-borne sound signals.

FIG. 4 shows the diagram 17 of the composite signals S, for example in the form of accelerations or variables calculated therefrom plotted against the wheel speed n over one rotation of the wheel. The curve 18 represents the composite signal S in the state in which solid-borne sound signals are not superimposed on it. In this context, the composite signals are marked at the positions A, B, C of the sensor unit 1 in FIG. 3. The sinusoidal rotational-speed-dependent component 22 of the composite signals forms the curve 18 when the wheel bearing 12 is not in a state of damage (FIG. 3).

Figure 5:
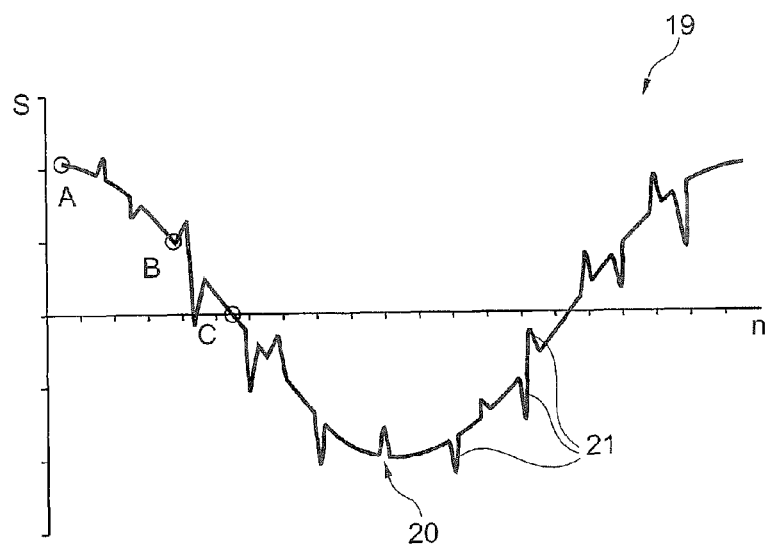
FIG. 5 shows a diagram of a profile of a composite signal plotted over the rotational movement of a wheel with solid-borne sound signals present.

The diagram 19 shown in FIG. 5 represents, in contrast to the diagram 17 in FIG. 4, the composite signal S on which a solid-borne sound component is superimposed, in the form of the curve 20 on which, in turn, the positions A, B, C of the sensor unit 1 in FIG. 3 are marked. The solid-borne sound signals 21 which are due to a state of damage of the wheel bearing 12 (FIG. 3) are superimposed on the sinusoidal profile of the rotational-speed-dependent component 22 (FIG. 4) of the composite signals S. The solid-borne sound signals 21 are separated from the rotational-speed-dependent component 22 (FIG. 4) by means of filter analysis methods and/or vibration analysis methods. The remaining solid-borne sound signals 21 are compared with calculated relevant comparison data which are determined empirically or in some other way, with the result that it is possible to determine a state of damage and, if appropriate, other sound sources can be excluded as a cause of the solid-borne sound signals 21. Due to an embodiment of the solid-borne sound signal pattern which is dependent on the geometric or structural embodiment of the roller bearing 12 (FIG. 3), comparison data which are respectively specifically adapted to bearing groups of the same or similar design can be used for the wheel bearings 12 which are used or examined.

LIST OF REFERENCE SYMBOLS

1 Sensor unit
1a Sensor unit
2 Adaptor
2a Adaptor
3 Acceleration sensor
4 Support surface
4a Contact surface
5 Clamping clip
6 Double arrow
7 Arrow
8 Rim
9 Tire
10 Screw
11 Screw circle
12 Wheel bearing
13 Rotational axis
14 Rim flange
15 Wheel
16 Arrow
17 Diagram
18 Curve
19 Diagram
20 Curve
21 Solid-borne sound signal
22 Rotational-speed-dependent component
A Position
B Position
C Position
n Wheel speed
S Composite signal

The invention claimed is:

1. An apparatus for determining a state of damage of a wheel bearing, in which a wheel with a tire arranged on a rim is rotatably provided on an axle of a motor vehicle, the apparatus comprising: a sensor unit which communicates with an evaluation unit for determining a state of damage, said sensor unit is removably attached directly to the rim at an attachment point located radially outside a screw circle of the rim.

2. The apparatus as claimed in claim 1, wherein the sensor unit is attached clamped between the tire and a rim flange of the rim.

3. The apparatus as claimed in claim 1, wherein the sensor unit is attached in a reversibly materially joined fashion to a rim bed of the rim.

4. The apparatus as claimed in claim 1, wherein the sensor unit contains an at least single-axis measuring acceleration sensor.

5. A method for determining a state of damage of a wheel bearing using the apparatus corresponding to claim 1, the method comprising: during maintenance on a motor vehicle, attaching the sensor unit which communicates with an evaluation unit to the wheel, detecting composite signals (S) of the sensor unit which are dependent on a wheel speed (n) of the wheel and on solid-borne sound, on the rotating wheel, separating solid-borne sound signals of the wheel bearing from the composite signals (S), comparing the solid-borne sound signals with comparison data which are relevant for the state of damage, determining a state of damage which results from the comparison, and removing the sensor unit from the wheel again.

6. The method as claimed in claim 5, wherein the solid-borne sound signals are acquired by filtering of the composite signals (S).

7. The method as claimed in claim 5, wherein the solid-borne sound signals are acquired from elimination of a rotational-speed-dependent component.

8. The method as claimed in claim 7, wherein the rotational-speed-dependent component is determined by using sensor signals of a rotational-speed-detection device which is fixedly arranged in the motor vehicle.

9. The method as claimed in claim 5, wherein the relevant comparison data are matched to a geometric embodiment of the wheel bearing.

10. The method as claimed in claim 5, wherein the wheel is at least roughly balanced after mounting of the sensor unit.

* * * * *